United States Patent [19]
Hori et al.

[11] Patent Number: 5,727,528
[45] Date of Patent: Mar. 17, 1998

[54] CONTROL APPARATUS AND CONTROL METHOD OF INTERNAL COMBUSTION ENGINE

[75] Inventors: Toshio Hori; Takeshi Atago, both of Hitachinaka, Japan

[73] Assignee: Hitachi, Ltd., Tokyo, Japan

[21] Appl. No.: 820,547

[22] Filed: Mar. 19, 1997

[30] Foreign Application Priority Data

Mar. 19, 1996 [JP] Japan ................................ 8-063005

[51] Int. Cl.$^6$ .................................................. F02M 51/00
[52] U.S. Cl. ................................................... 123/486
[58] Field of Search .............................. 123/486, 361, 123/527

[56] References Cited

U.S. PATENT DOCUMENTS 4,957,089  9/1990  Morikawa ........................... 123/486
5,345,918  9/1994  Lambert ............................. 123/527
5,363,826  11/1994  Takoaka ............................ 123/486
5,642,709  7/1997  Ozaki et al. ....................... 123/361

Primary Examiner—Raymond A. Nelli
Attorney, Agent, or Firm—Antonelli, Terry, Stout, & Kraus, LLP

[57] ABSTRACT

A control apparatus of an internal combustion engine has: an air flow amount determining unit for determining a request intake air flow amount corresponding to a target output of an engine; a fuel flow amount determining unit for determining a request fuel flow amount to be supplied to the engine; an intake air amount limiting unit for outputting a predetermined limit value as an intake gas total amount value when the determined request intake air flow amount exceeds the predetermined limit value under a predetermined control condition; and a correcting unit for correcting the value of the request fuel flow amount so that the engine generates the target output on the basis of the request intake air flow amount and the limit intake air flow amount when the intake air amount of the engine is limited.

21 Claims, 15 Drawing Sheets

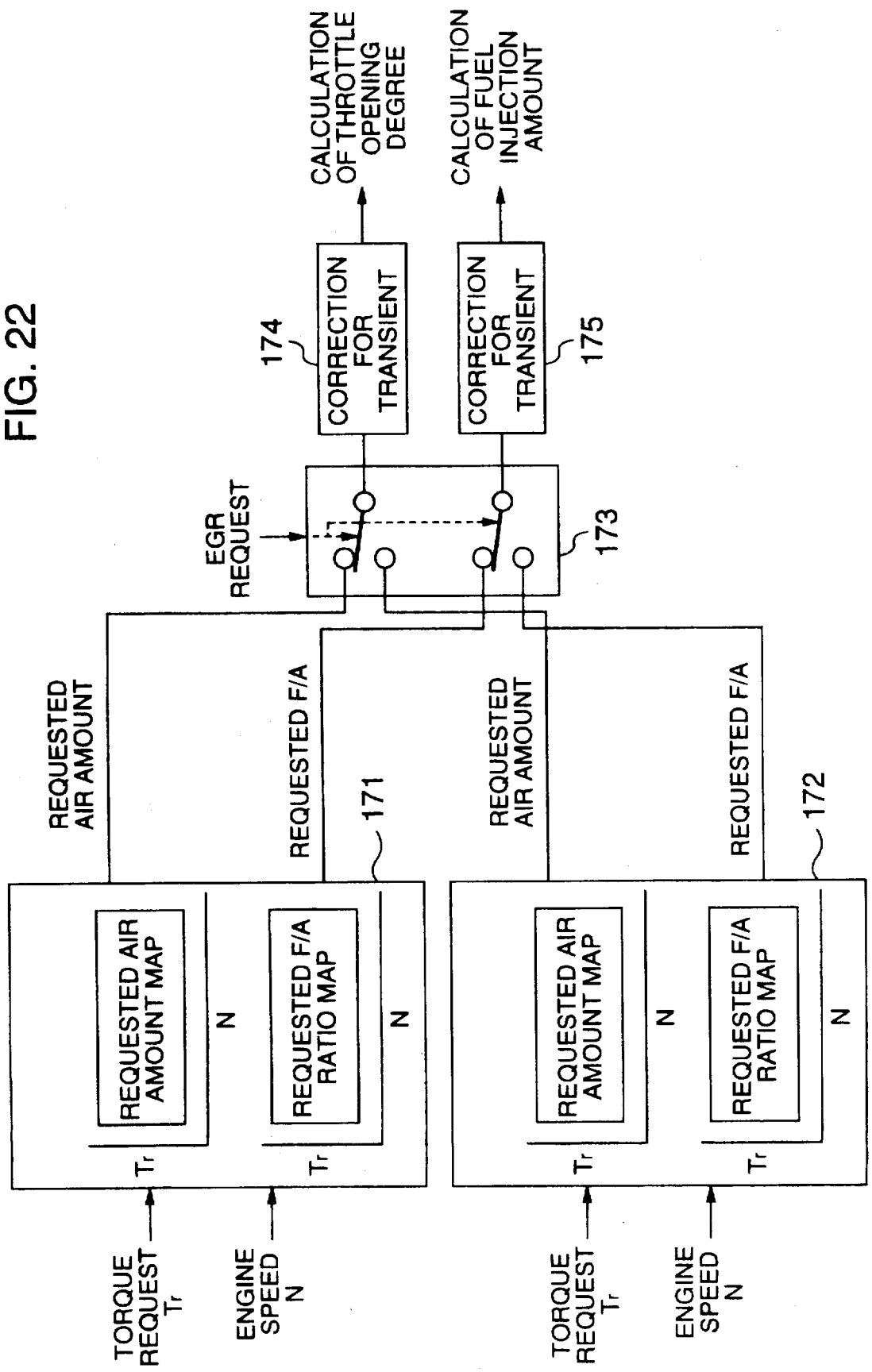

CONTROL APPARATUS AND CONTROL METHOD OF INTERNAL COMBUSTION ENGINE

BACKGROUND OF THE INVENTION

The invention relates to a control technique of an internal combustion engine and, more particularly, to apparatus and control method for controlling both of a fuel flow amount and an intake air flow amount which are supplied to an engine.

In order to reduce an $NO_x$ component in an exhaust gas, many vehicles have engines each including an EGR (Exhaust Gas Recirculation) apparatus at present. By the EGR apparatus, a part of the exhaust gas in an exhaust pipe is returned to an intake pipe and is inhaled into a combustion chamber together with a mixture.

The EGR apparatus is constructed with a passage for connecting the exhaust pipe to the intake pipe and an EGR valve for controlling a gas flow amount which can be controlled within a range from a closing state to a maximum opening state of the passage. Ordinarily, since a pressure in the exhaust pipe is positive and a pressure in the intake pipe is negative, a part of the exhaust gas is introduced to the intake pipe through the EGR valve by a pressure difference between the exhaust pipe and the intake pipe.

A recirculation amount of the exhaust gas by the EGR apparatus, namely, an EGR amount is determined in accordance with a driving state of the engine. When the engine is driven in a heavy load state and an intake air amount increases, a value of the negative pressure (vacuum) of the intake pipe decreases and the recirculation amount of the exhaust gas by the EGR apparatus is reduced. When a large quantity of exhaust gas is recirculated into the intake pipe, generally, although a reduction effect of $NO_x$ is large, an output reduction of the engine occurs.

In JP-A-2-201067 as an Official Gazette of Japanese patent application, there has been disclosed a method of compensating the output reduction of the engine which occurs when the EGR amount is increased by using a constant speed running system (auto cruising system), increasing a throttle opening degree, and increasing the intake air flow amount.

According to the invention disclosed in the above Official Gazette, when the intake air flow amount is increased in order to compensate the output reduction, the vacuum in the intake pipe is reduced and the EGR amount is reduced. When an exhaust gas recirculating ability of the EGR apparatus cannot be effectively utilized due to such a decrease in vacuum in the intake pipe, there is a problem such that the necessary EGR amount determined in accordance with the driving state cannot be guaranteed.

Many of the current vehicles have several apparatuses which are operated by using the vacuum of the intake pipe of the engine. In addition to the EGR apparatus, there are an evaporation control system, a brake booster, and the like. The evaporation control system is a system such that a fuel vapor which is evaporated from a fuel system is adsorbed to activated charcoal filled in a canister and the adsorbed fuel is purged into the intake pipe by the vacuum of the intake pipe. In the several apparatuses using the vacuum of the intake pipe as mentioned above, when the intake air flow amount increases and then the vacuum of the intake pipe decreases, there is a case where a desired engine performance cannot be effected.

SUMMARY OF THE INVENTION

It is an object of the invention to provide a control apparatus for maintaining a negative pressure of an intake pipe to a certain degree so that an apparatus using the vacuum can maintain a desired performance and for controlling an output of an engine to a target value and to provide its control method.

According to one aspect of the invention, an intake air flow is limited so that a value of a total intake air amount which is requested to an engine doesn't exceed a predetermined limit value and, simultaneously, an output change due to the intake air limitation is compensated by an adjustment of a fuel flow amount, thereby maintaining a target output.

Other objects and advantages of the present invention will become apparent from the detailed description to follow taken in conjunction with the accompanying drawings.

BRIEF DESCRIPTION OF THE DRAWINGS

FIG. 22 is a block diagram of a control apparatus of an engine according to further another embodiment of the invention.

DESCRIPTION OF THE PREFERRED EMBODIMENTS

Figure 1:
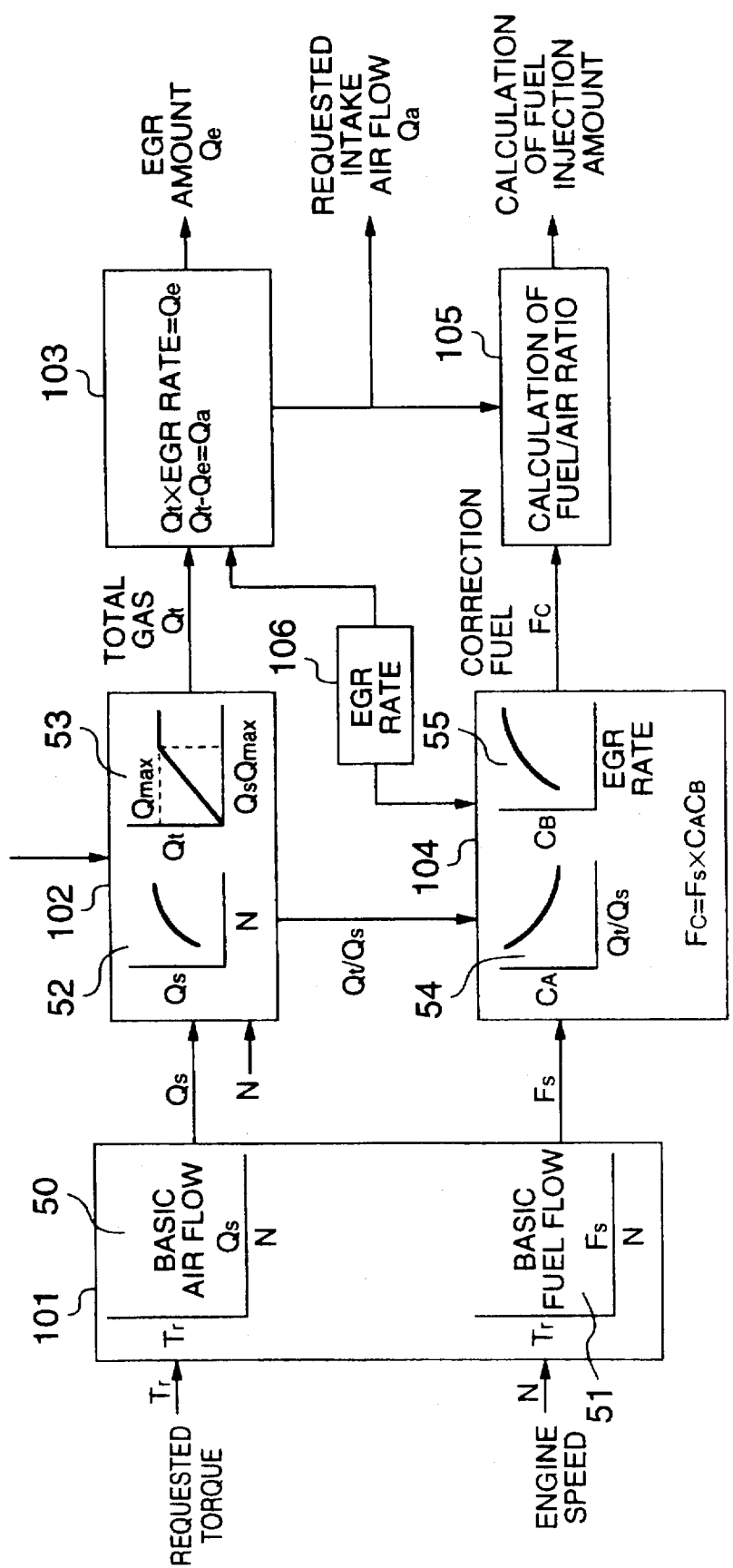
FIG. 1 is a block diagram of a control apparatus of an engine according to an embodiment of the invention.

A control apparatus of an internal combustion engine according to the invention will now be described in detail hereinbelow with reference to an embodiment shown in the drawings.

Figure 3:
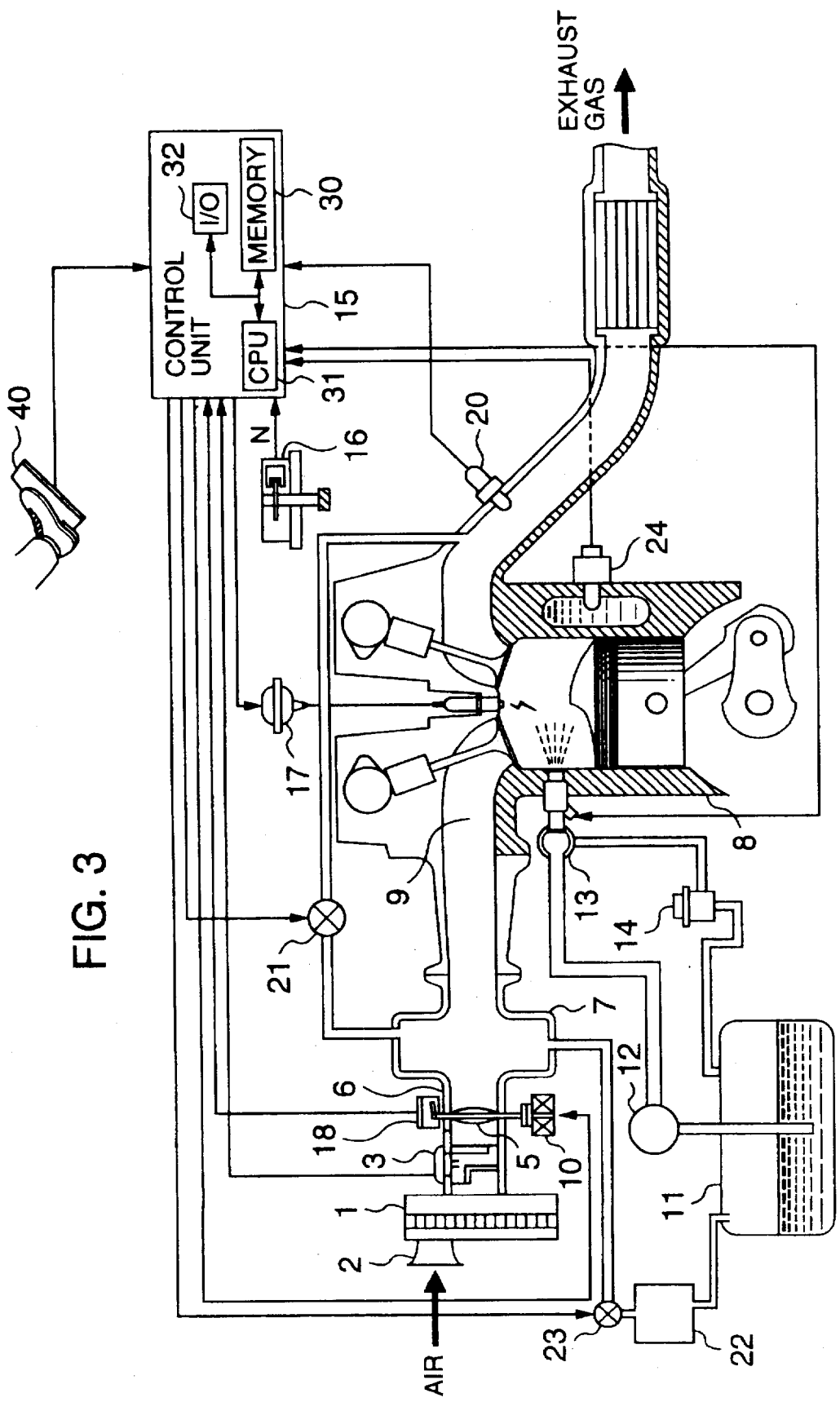
FIG. 3 shows an engine to which a control apparatus and a control method of the invention are applied and an intake system, an exhaust system, a fuel system, and the control apparatus which are connected to the engine.

FIG. 3 shows an example of an engine system to which the invention is applied. In the diagram, air to be inhaled by an engine is taken from an inlet portion 2 of an air cleaner 1, passes through a throttle body 6 in which a throttle valve 5 for controlling an intake air amount is arranged, and enters a collector 7. The throttle valve 5 is coupled to a motor 10 for driving the valve. The throttle valve 5 is operated by driving the motor 10, thereby enabling the intake air amount to be controlled. The intake air which reached the collector 7 is distributed to each intake pipe 9 or manifold connected to each cylinder of an engine 8 and is introduced into the cylinder.

On the other hand, fuel such as gasoline or the like is inhaled from a fuel tank 11 by a fuel pump 12 and is pressurized. After that, the fuel is supplied to a fuel system in which a fuel injection valve 13 and a fuel pressure regulator 14 are arranged. A pressure of the fuel is adjusted to a predetermined pressure by the foregoing fuel pressure regulator 14 and is injected into a cylinder from the fuel injection valve 13 whose fuel injection port is opened to each cylinder. A signal indicative of an intake flow amount is generated from an air flow meter 3 and is inputted to a control unit 15.

Further, a throttle sensor 18 for detecting a degree of opening of the throttle valve 5 is attached to the throttle body 6. An output of the sensor 18 is also inputted to the control unit 15.

Reference numeral 16 denotes a crank angle sensor. The crank angle sensor 16 cooperates with a cam shaft, thereby generating a signal indicative of a rotating position of a crank shaft. The crank angle signal is also inputted to the control unit 15.

Reference numeral 20 denotes an A/F (air/fuel ratio) sensor provided in the exhaust pipe. The sensor 20 detects an A/F of a mixture in actual operation of the engine by detecting components of exhaust gas, and outputs a detection signal. The A/F signal is also inputted to the control unit 15.

The control unit 15 also generates an ignition signal in accordance with an ignition timing control program and supplies the signal to a coil 17. The coil 17 generates a high voltage signal to be supplied to a spark plug in accordance with the ignition signal. Reference numeral 21 denotes an EGR valve. The control unit 15 decides an EGR rate corresponding to a driving condition and generates a control signal to open or close the EGR valve 21 in accordance with the EGR rate. Reference numeral 22 denotes a canister having activated charcoal therein. The canister 22 adsorbs fuel vapor which are generated in the fuel tank 11. Reference numeral 23 indicates a control valve provided in a passage which connects the canister 22 and intake pipe 9. When the control unit 15 generates the control signal and opens the control valve 23 under a predetermined driving condition, the fuel vapor adsorbed in the canister 22 is purged into the intake pipe 9. Reference numeral 24 denotes a temperature sensor 24 of an engine coolant. An output of the temperature sensor 24 is supplied to the control unit 15 and is used as one of parameters for the engine control. Reference numeral 40 indicates an acceleration pedal which is operated by the driver. A depression amount of the acceleration pedal is detected and inputted to the control unit 15. The detected value is used to decide a target output.

The control unit 15 has a microcomputer including a CPU 31, an input/output control unit 32 (hereinafter, abbreviated to "I/O"), and a memory 30 for storing data and a control program.

The control unit 15 fetches signals from various sensors and the like for detecting the driving state of the engine as input data through the I/O 32. In accordance with the program stored in the memory 30, the CPU 31 executes a predetermined arithmetic operating process to the input data and outputs calculated various control signals as arithmetic operation results through the I/O 32. The control signals from the control unit 15 are supplied to the foregoing fuel injection valve 13, ignition coil 17, and motor 10 for operating the throttle valve, so that a fuel supply control, an ignition timing control, and an intake air amount control are executed.

Figure 12:
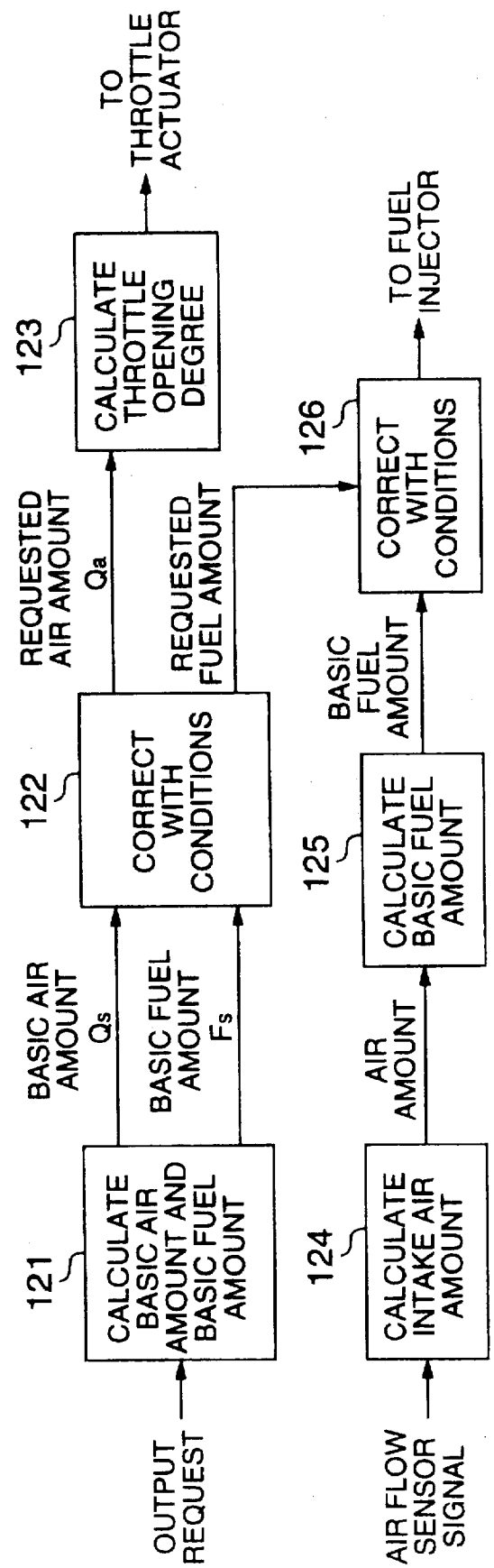
FIG. 12 is a block diagram showing a fundamental whole construction of a fuel control and an intake air amount control of an engine to which the invention is applied.

FIG. 12 shows a general construction of the air and fuel control according to the embodiment of the invention. In FIG. 12, an engine output which is shown by, for example, a depression amount of the acceleration pedal 40 and which is requested by the driver is converted to an output request value for the engine and is supplied to a block 121. In the block 121, in order to obtain a desired engine output, basic values of the proper air amount and fuel amount are calculated from the driving condition of the engine. In a next block 122, the air amount and fuel amount are corrected further in detail in accordance with the driving condition, thereby calculating request amounts, respectively. In a block 123, the request air amount is converted to a throttle opening degree to realize such a request amount and is instructed to an actuator. On the other hand, as for a supply fuel amount, since an accurate amount calculation is required, the amount of air which the engine actually inhales is detected by the exclusive-use air flow meter 3 and a basic fuel amount whereby a predetermined A/F is obtained is calculated in correspondence to the air amount in blocks 124 and 125. Subsequently, in a block 126, a condition correction is performed on the basis of the request fuel amount instructed from the block 122 and, after that, an instruction is supplied to the fuel injection valve.

Figure 2:
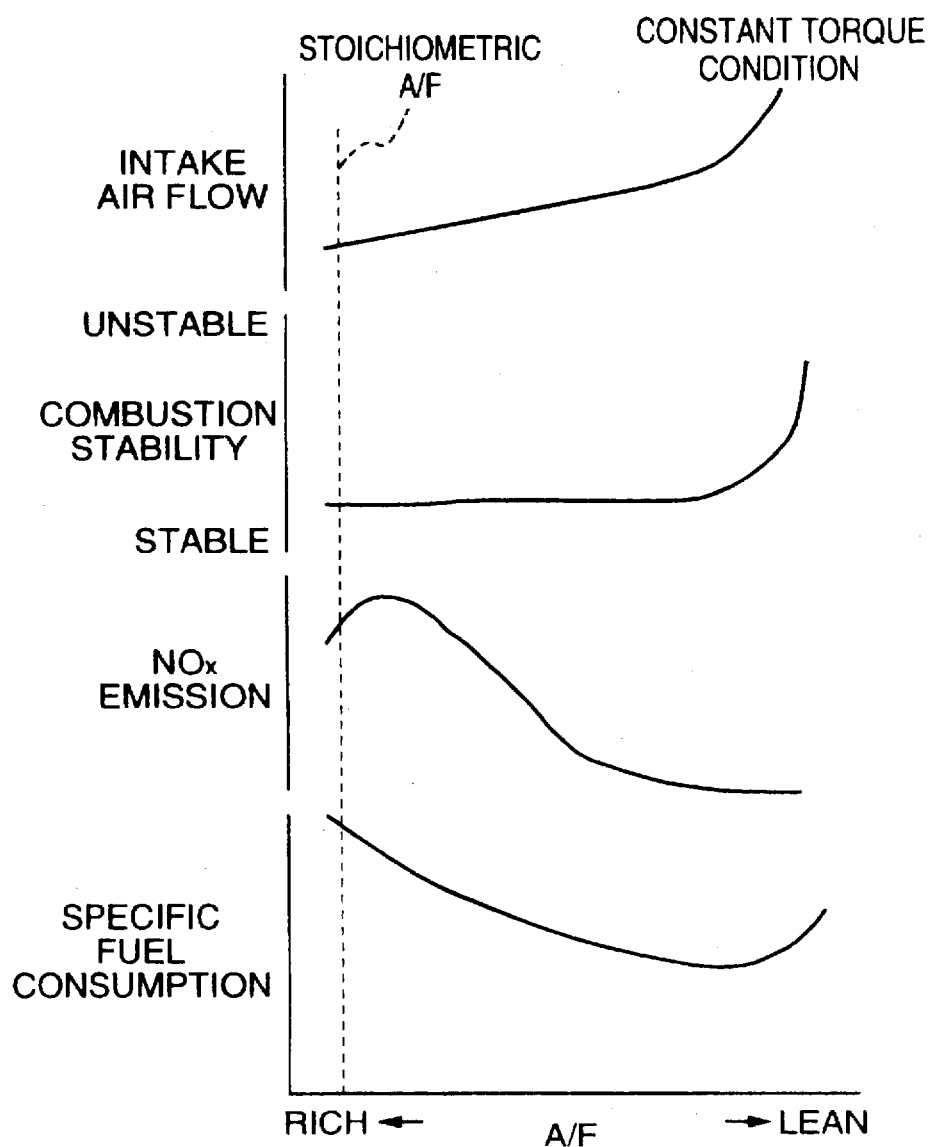
FIG. 2 is a characteristics graph of several parameters of an engine for an air/fuel ratio.

In the engine, when the A/F of the mixture to be burned is set to be leaner than a stoichiometric A/F, characteristics shown in FIG. 2 are obtained. When a torque and an engine speed are held constant and the A/F is set to be lean, since the intake air amount increases, a specific fuel consumption, which represents a conversion efficiency from the fuel energy to an engine output, decreases, that is a fuel economy is improved. On the other hand, when the A/F becomes lean, a combustion temperature drops, so that an $NO_x$ emission amount decreases. As for a combustion stability which is quantitatively measured by a torque fluctuation, when the A/F of the mixture becomes leaner, an ignition performance of the mixture deteriorates. The combustion stability gently deteriorates up to a certain A/F. When the mixture enters a lean region over the certain A/F, since the ignition performance extremely deteriorates, such a stability suddenly deteriorates. In an engine in which the fuel is directly injected into a cylinder, since a fuel flow in the cylinder is controlled, a degree of freedom in design of a combustion chamber and its peripheral structure is high. Thus, a structure in which a stable combustion can be assured even at a super lean A/F of 40 or more can be formed.

Figure 9:
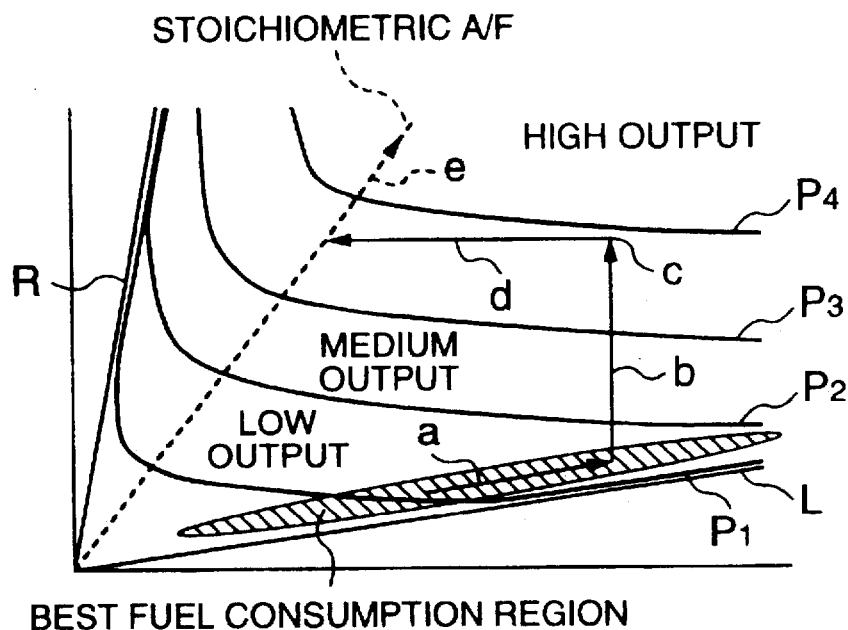
FIG. 9 shows an example of isohorsepower line of an engine of a form to directly inject fuel into a cylinder.

FIG. 9 shows an example of isohorsepower line of a lean burn engine of a form in which the fuel is directly injected into the cylinder. An axis of abscissa denotes an intake air flow amount to be supplied to the engine and an axis of ordinate indicates a fuel flow amount to be supplied to the engine. $P_1$, $P_2$, $P_3$, and $P_4$ shown by bold solid lines denote isohorsepower lines of the engine. Output values become larger in accordance with the order of $P_1$, $P_2$, $P_3$, and $P_4$. A steep line R denotes a rich limit, and a gradual ascent line L indicates a lean limit. A broken line denotes a stoichiometric A/F. Ordinarily, in an engine of a vehicle having a 3-way catalyst converter to reduce three kinds of components of $NO_x$, HC, and CO in the exhaust gas in a lump, in order to maintain the A/F to the stoichiometric A/F, the fuel flow amount and the intake air flow amount are controlled so as to move on the broken line at the time of the output control of the engine.

It will be understood that a hatched lean A/F region near the lean limit line L is a driving region in which the required fuel amount to obtain a certain constant output is smallest, namely, the best fuel economy is obtained. It will be obviously understood from FIG. 9 that when a predetermined output is generated, a larger air amount is required in case of driving in the lean A/F region rather than in case of driving in the other regions. Further, since a reduction in $NO_x$ by the 3-way catalyst converter cannot be expected in the lean A/F region, it is necessary to suppress the generation of $NO_x$ by another means.

In the actual vehicle, since it is driven within a wide range from a low load to a high load and the air flow amount which can be inhaled by the engine is limited, a region in which the vehicle can be driven at the lean A/F is restricted. Therefore, different types of modes including a control at the lean A/F in consideration of the fuel economy, a control at the stoichiometric A/F whereby a best effect of the 3-way catalyst converter is derived, and a control at a rich A/F in consideration of the maximum output power are needed.

In a map of the isohorsepower lines in FIG. 9, various driving modes to control the engine output are shown. For example, an operation locus shown by an arrow (a) denotes a lean A/F driving mode region, and an operation locus shown by an arrow (e) indicates a driving mode region in which the vehicle is driven at the stoichiometric A/F. An operation locus shown by an arrow (b) indicates a mode to control the output by adjusting the fuel flow amount while keeping the intake air amount constant. An operation locus shown by an arrow (d) denotes a mode to shift to the stoichiometric A/F mode by adjusting the intake air flow amount while keeping the fuel flow amount constant.

At the A/F where the performance of the 3-way catalyst converter cannot be effected (for instance, in the lean region), the EGR apparatus is made operative and the combustion temperature is decreased, thereby reducing $NO_x$. When a target EGR rate is decided, the control unit 15 controls the EGR valve 21 so that the EGR amount corresponding to the target EGR rate is obtained.

Figure 8:
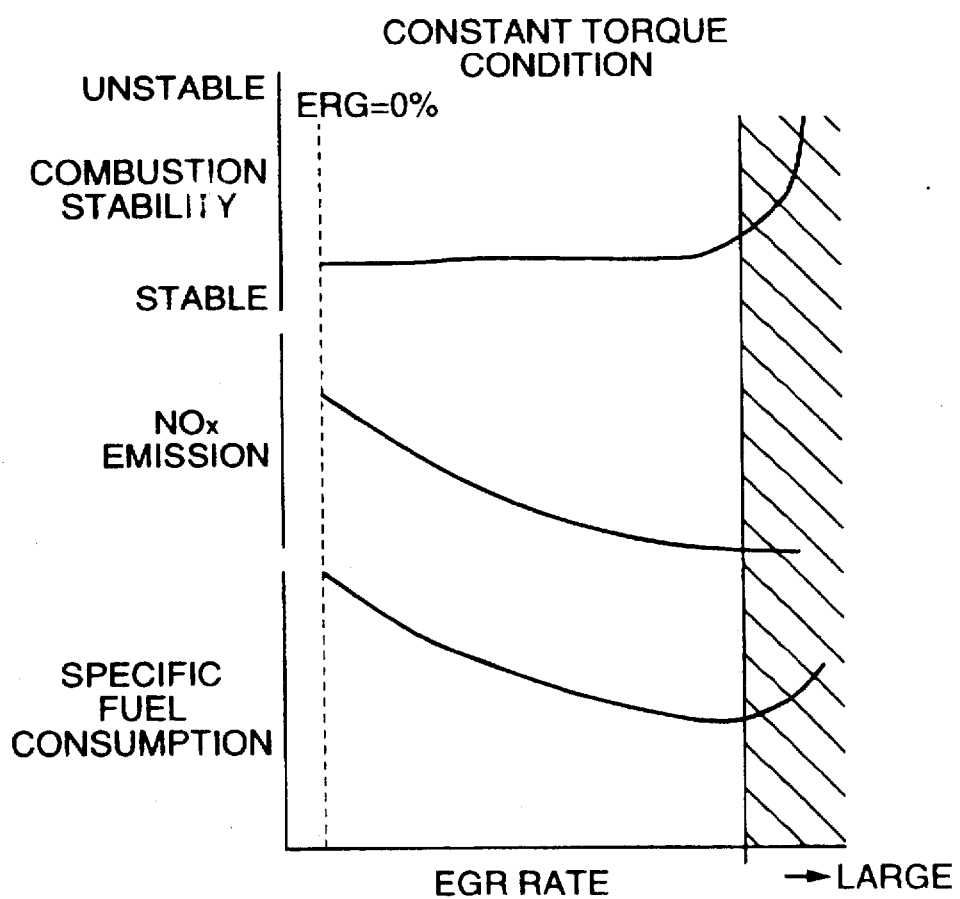
FIG. 8 is a characteristics graph showing changes in values of several parameters of the engine for a change in an EGR rate.

FIG. 8 shows changes in several parameters of the engine when the EGR amount is changed under a condition of the constant torque. An axis of abscissa indicates an EGR rate as a rate of the exhaust gas intake amount from the EGR for the intake air amount. An axis of ordinate denotes a combustion stability, an $NO_x$ emission amount, and a specific fuel consumption. When the EGR rate is increased from 0%, the combustion temperature drops, so that the amount of $NO_x$ decreases. In association with it, since the gas amount to be inhaled by the engine increases, a pumping loss decreases and the specific fuel consumption decreases, namely, the fuel economy is improved. Further, when the EGR rate is further raised, an oxygen concentration in the intake gas drops, so that a stable combustion becomes difficult and the combustion stability deteriorates. In association with it, the specific fuel consumption turns increasing from reducing. Therefore, the hatched region in FIG. 8 cannot be used for the actual driving.

Figure 4:
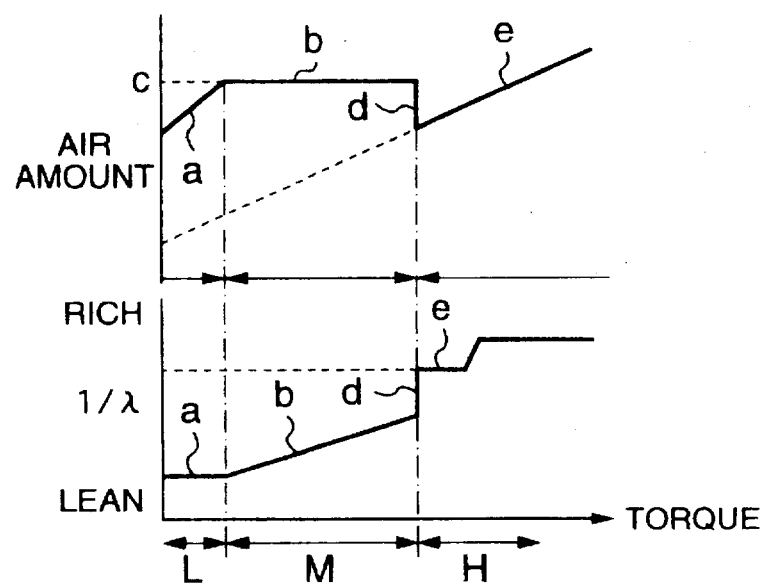
FIG. 4 is a control characteristics graph for explaining a method of controlling an output torque and an intake air amount in the embodiment of the invention.

A method whereby the control of the output torque of the engine described above is performed by controlling the intake air amount and fuel flow amount will now be described with reference to FIG. 4. FIG. 4 shows characteristics under a condition such that the engine speed is set to a predetermined value, an axis of abscissa indicates an output torque, an upper axis of ordinate indicates an intake air amount, and a lower axis of ordinate indicates a reciprocal number $1/\lambda$ of an excess air ratio $\lambda$. The excess air ratio $\lambda$ is a ratio obtained by dividing an air amount of the mixture of a certain A/F by an air amount of a stoichiometric A/F. In case of the stoichiometric A/F, the excess air ratio $\lambda$ is equal to 1. When the mixture is richer than the stoichiometric A/F, the excess air ratio $\lambda$ is smaller than 1. When the mixture is leaner than the stoichiometric A/F, the excess air ratio $\lambda$ is larger than 1. On the lower axis of ordinate in FIG. 4, an upper region of the axis of ordinate shows the rich side and a lower region shows the lean side.

A torque range shown by L where the torque lies within a range from the minimum value to a certain predetermined low value corresponds to an operation locus a in FIG. 9. In the torque range L, the output torque can be adjusted by increasing or decreasing of only the intake air amount while keeping the excess air ratio of a lean limit. A torque range M corresponds to an operation locus of b in FIG. 9. In the range M, the torque is adjusted by controlling (control of $\lambda$) only the fuel flow amount while keeping an intake air limit value c (FIG. 9). The intake air limit value c is provided to assure a negative pressure of the intake pipe for making the EGR or evaporation control apparatus operative. The intake air limiting operation will be described in detail hereinlater. A Torque range H corresponds to operation loci of d and e in FIG. 9. A value of the excess air ratio at the boundary between the torque ranges M and H is determined by an upper limit value at which the emission amount of $NO_x$ is allowed. To avoid that $NO_x$ exceeds a permissible upper limit, in the torque range H, the air amount is controlled and the engine is driven in the stoichiometric A/F, and the 3-way catalyst converter works efficiently. At the high torque region of the torque range H, the mixture is enriched to the A/F richer than the stoichiometric A/F, and a high output is obtained.

Figure 10:
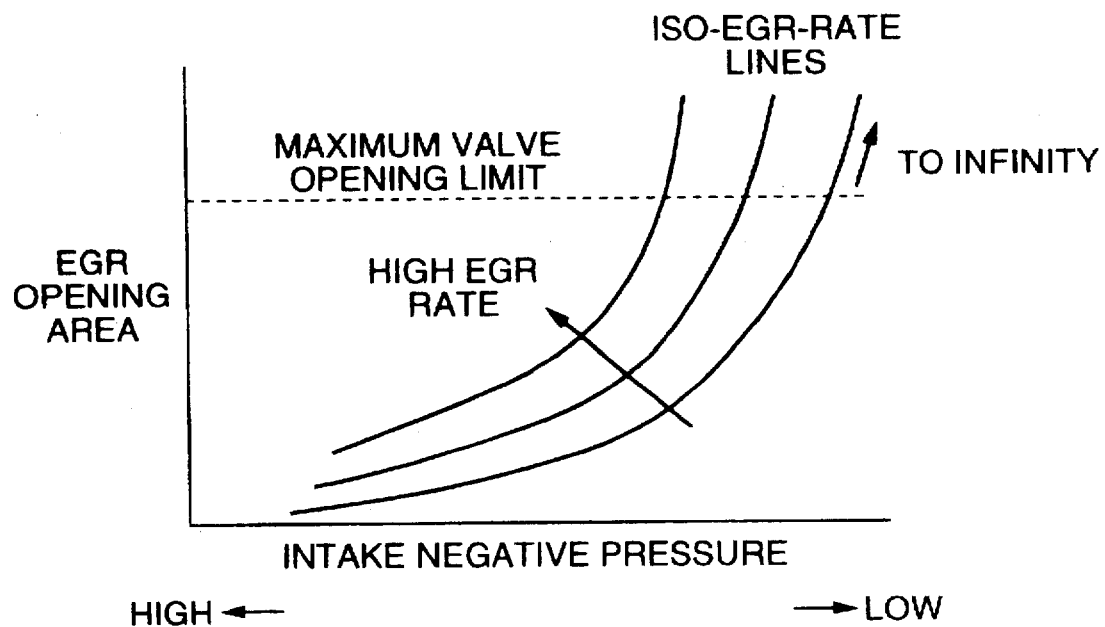
FIG. 10 shows an example of equal EGR rate curves of an engine having an EGR apparatus.
Figure 15:
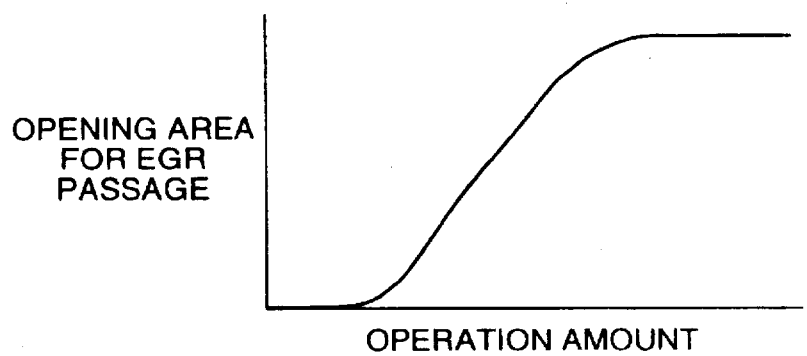
FIG. 15 shows operating characteristics of a general EGR apparatus.

The operation of the EGR will now be described. By opening the EGR valve and introducing the exhaust gas into the intake gas, an inconvenience which will be explained hereinbelow occurs. FIG. 15 shows characteristics of a general EGR valve. The EGR valve is closed when an operation amount of the EGR valve actuated with a control signal from the control unit 15 is zero. When the operation amount is raised from this closed state, a gas metering portion in the EGR valve is opened, and an opening area of a gas passage increases. When the operation amount is equal to or larger than a predetermined value, the opening area reaches the maximum opening area. No more opening area is available in the EGR valve. The reason why the exhaust gas can be introduced to the intake air side is because the pressure of the exhaust pipe is higher than the pressure of the intake pipe and there is a pressure difference between the upstream and the downstream of the EGR valve. FIG. 10 is a graph of iso-EGR-rate curves, an axis of abscissa denotes an intake negative pressure of the intake pipe, and an axis of ordinate indicates an opening area of the EGR. As the intake negative pressure approaches the exhaust pipe pressure (in the right direction of the axis of abscissa), the opening area of the EGR valve that is necessary to keep a desired EGR rate increases. Theoretically speaking, when the intake pipe decreases and the pressure difference between the intake negative pressure and the exhaust pipe is equal to 0, an infinite opening area is required irrespective of the requested EGR rate. Actually, as mentioned above, the mechanical and dimensional conditions of the EGR valve restrict the available maximum opening area. Since an upper limit in the maximum opening area of the EGR valve is restricted by a required control precision of the EGR opening area, in order to realize a predetermined EGR rate, it is necessary that the intake negative pressure is kept on the vacuum by a predetermined value or more.

Figure 7:
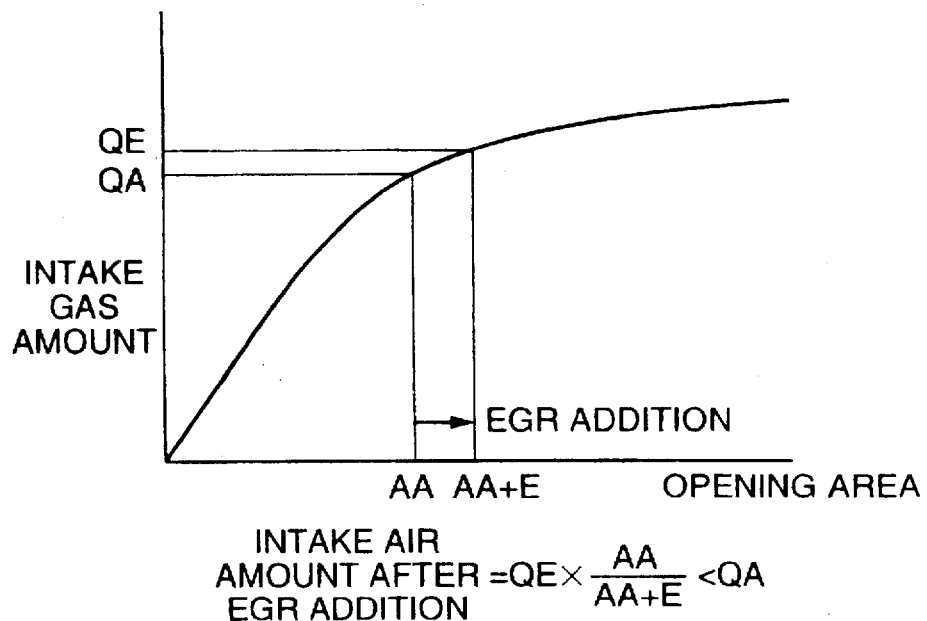
FIG. 7 is a characteristics graph showing the relation of an intake gas flow amount for a total opening area of an intake pipe.

In a certain operating state of the engine, when the EGR valve is opened, an output of the engine decreases due to a phenomenon as shown in FIG. 7. In FIG. 7, an axis of abscissa indicates a total opening area of the intake pipe, and an axis of ordinate indicates an amount of gas to be inhaled into the engine at a constant engine speed. For the total opening area, the amount of gas to be inhaled into the engine is shown by a curve like a square root.

The total opening area is a total area of a cross sectional area of an intake passage of the intake pipe, a cross sectional area of a gas passage of the EGR, a cross sectional area of a purge pipe of the evaporation gas, and an area of a passage connecting the intake pipe to an apparatus which operates by using the intake vacuum.

It is now assumed that the engine is operated under conditions such that the opening area is equal to AA and the intake gas amount at that time is equal to QA in an inoperative mode of the EGR. QA denotes that the whole gas is the air. Now, assuming that the EGR is executed at an opening area E of the EGR passage, the total opening area is equal to AA+E and the intake gas amount increases to QE. As shown in an equation in the diagram, a ratio of the air to the whole intake gas occupied in QE is equal to a ratio of the opening area of the intake air for the total opening area in a total intake gas amount QE and has a value smaller than QA. Particularly, if the A/F is not controlled, the engine output is proportional to the intake air amount, so that a decrease in intake air amount results in a decrease in output of the engine.

To solve the inconvenience as mentioned above, according to the embodiment of the invention, a control process of an intake air limitation as shown in FIG. 1 is executed. In a control block diagram shown in FIG. 1 corresponds to the portions of block 121 for calculation of the basic air amount and basic fuel amount and block 122 for the condition correction in the control block diagram of FIG. 12 described before.

A function of a block diagram shown in FIG. 1 can be executed by the control program stored in the memory 30 of the control unit 15 or by an exclusive-use control circuit which can be provided in the control unit 15. In functional block 101, a basic air amount Qs and a basic fuel amount Fs are determined on the basis of a torque request value Tr and an engine speed value N which were inputted. The torque request value Tr corresponds to a depression amount of the acceleration pedal 40. The engine speed N is detected by the sensor 16. Block 101 includes a data map 50 in which a value Qs of the basic air amount that is determined by the rotational speed N and torque request value Tr is shown, and a data map 51 in which a value Fs of the basic fuel amount that is decided by the rotational speed N and the torque request value Tr is shown. When the torque request value Tr and the engine speed value N are inputted, the basic air amount Qs and basic fuel amount Fs are read out from the maps 50 and 51. The maps 50 and 51 are experimentally predetermined. The values of the basic air amount Qs and basic fuel amount Fs derived from the maps correspond to a certain one point determined by the torque request value in the isohorsepower lines in FIG. 9. When the A/F is maintained to a specific value, for example, a lean A/F, it is sufficient that data such that the ratio of the basic air amount Qs and basic fuel amount Fs is equal to the lean A/F is set into the maps. The basic air amount Qs and basic fuel amount Fs are set to values which are decided without considering the EGR.

The engine control in this embodiment is a torque control in which a torque request is used as a target parameter. The engine speed N is a resultant parameter in which the value is determined at a time point when the mixture is inhaled into the engine and an output power of the engine balances with a load. It is difficult to control the output power by directly controlling the engine speed. In order to control the engine output under the conditions of the air amount and fuel amount according to the load on the engine, it is proper to control the torque instead of the engine speed.

Figure 5:
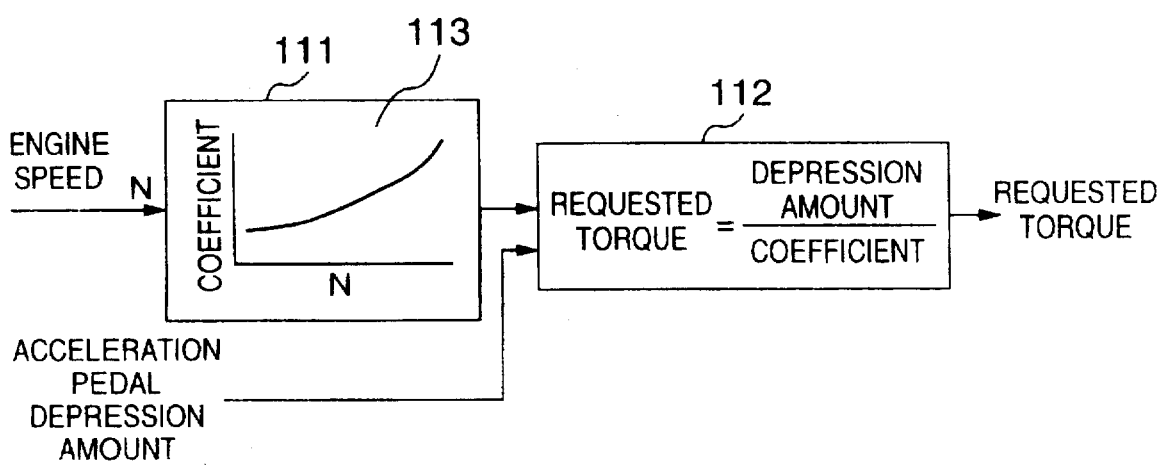
FIG. 5 is a block diagram of a system for setting a request output value for an acceleration pedal depression amount in the embodiment of the invention.

An example of a method of deciding the torque request value Tr which is inputted to functional block 101 on the basis of the depression amount of the acceleration pedal 40 will now be described with reference to the block diagram of FIG. 5. The torque request value Tr is obtained by dividing the requested output value by the engine speed N. The depression amount of the acceleration pedal corresponds to the output value which is requested by the driver for the engine. Therefore, the torque request value Tr is derived by dividing the depression amount of the acceleration pedal by the engine speed N. In the example of FIG. 5, in place of the engine speed, the torque request value is calculated by dividing the depression amount of the acceleration pedal by a coefficient value corresponding to the engine speed.

In FIG. 5, the coefficient values having an almost proportional relation with the rotational speed is obtained from the characteristic curve 113 provided in block 111. In block 112, the torque request value is obtained by dividing the acceleration pedal depression amount by such a coefficient. Thus, characteristics 113 of the engine output by the acceleration pedal depression amount can be modified according to the design requests. For example, when setting such that a slightly high engine output is requested in a low rotational speed region, the driver can feel tenacious driving characteristics. When setting such that a slightly high engine output is requested in the high rotational speed region, the driver can feel powerful driving characteristics of a high load.

The block diagram shown in FIG. 1 will now be described. The basic air amount Qs determined in block 101 and the present engine speed N are inputted to block 102. An intake air amount is limited in block 102. Namely, when an apparatus using the intake pipe negative pressure, for example, the EGR apparatus is made operative, a negative pressure of a certain degree is necessary. Therefore, the intake air amount is set so as not to exceed a predetermined upper limit value. As an apparatus using the intake pipe negative pressure, there is an evaporation system, a brake booster, or the like other than the EGR apparatus. In case of a driving condition such that the apparatus using the intake pipe negative pressure is not made operative, the intake air limitation of block 102 is not performed but both of the basic air amount Qs and the basic fuel amount Fs are outputted as they are to next block 103. In FIG. 1, a case of making the EGR apparatus operative will be described as an example.

Block 102 has a map 52 which indicates data of a maximum permissible intake air amount Qmax that is determined in accordance with the value of the engine speed N. The maximum permissible intake air amount Qmax which assures the intake pipe negative pressure of a predetermined value or more at a given engine speed N. The value of Qmax is experimentally determined. In block 102, for the purpose of the intake air limitation, its input/output characteristics are set like characteristics 53. Namely, when the basic air amount Qs as an input is equal to or less than the maximum intake air amount Qmax that is decided by the map 52, the gas request amount Qt as an output is equal to Qs. When the basic air amount Qs as an input exceeds the maximum intake air amount Qmax that is decided by the map 52, the gas request amount Qt as an output is equal to Qmax irrespective of Qs. Therefore, under conditions where the EGR apparatus operates, since the gas request amount Qt as an output of block 102 doesn't exceed the value of the maximum permissible intake air amount Qmax, the intake air pipe negative pressure that is necessary for the EGR is assured.

When the basic air amount Qs determined in block 101 is larger than Qmax, if the intake air amount is limited to Qmax, the torque request value Tr is not generated. Therefore, when the intake air is limited, by correcting a fuel flow amount has to be corrected and be compensated so as to obtain the target output. The fuel correcting process will now be described hereinlater with reference to block 104.

Figure 11:
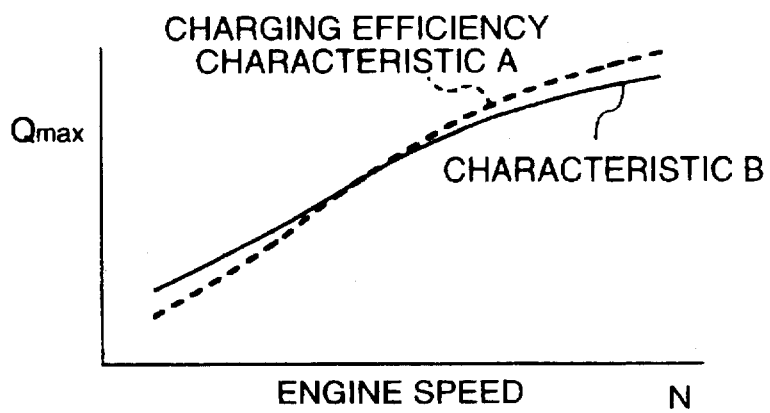
FIG. 11 is a characteristics graph of a charging efficiency for an engine speed.

FIG. 11 shows a specific example of the map 52 in block 102.

FIG. 11 shows characteristics of the maximum air amount Qmax of an engine having a specific apparatus which can change a charging efficiency of the engine. Specifically speaking, such an apparatus is a variable valve timing apparatus which can change the opening and closing actions of the intake/exhaust valves, and a variable air intake path which can change a length of intake pipe, or the like. Namely, the charging efficiency can be changed by a variable apparatus as mentioned above. FIG. 11 shows two characteristics A and B of different charging efficiencies. The characteristics of the maximum intake air amount in which a degree of vacuum of a predetermined value or more can be assured are different in dependence on a difference of the charging efficiency. Therefore, the value of Qmax can be changed by those operating states. Further, when the engine has a sensing device which can directly or indirectly detect the intake negative pressure, a learning method for updating the characteristics of map 52 on the basis of a detected vacuum value is also utilized in the present invention.

The air of the amount limited in block 102 is subsequently supplied to block 103 as a request amount Qt of the total amount of gas to be inhaled by the engine. In block 103, the total gas amount Qt is divided to an EGR amount Qe and an intake air amount Qa here. Thus, since the total amount Qt of gas to be inhaled is restricted, a decrease in intake negative pressure doesn't occur.

In block 103, the EGR amount Qe and request intake air amount Qa are determined on the basis of the total gas amount Qt outputted from block 102 and the EGR rate determined in block 106. The EGR amount Qe is obtained by multiplying the total gas amount Qt with the EGR rate. A remainder obtained by subtracting the EGR amount Qe from the total gas amount Qt is set to the request intake air amount Qa. The EGR rate is experimentally predetermined on the basis of a reduction rate of $NO_x$ in accordance with the driving state.

The request EGR amount Qe is supplied to a process for deciding a drive amount of the EGR valve and is used to determine the opening area of the EGR valve in accordance with characteristics of FIG. 15. As also described in FIG. 12, the request air amount Qa is supplied to block 123 to calculate the throttle opening degree. Block 103 can cope with a case where a request of the EGR rate changes due to the driving conditions, for example, a case of using a system in which the EGR rate is controlled so as to obtain a target combustion state while monitoring the engine speed, exhaust gas, operating state of the EGR valve, and the like by sensors. As a gas amount to be distributed from the total gas amount Qt, further, a gas amount of a canister purge can be also determined. In this case, the value of the gas amount of the canister purge distributed is supplied and used for calculation of the opening degree of the purge valve.

Figure 16:
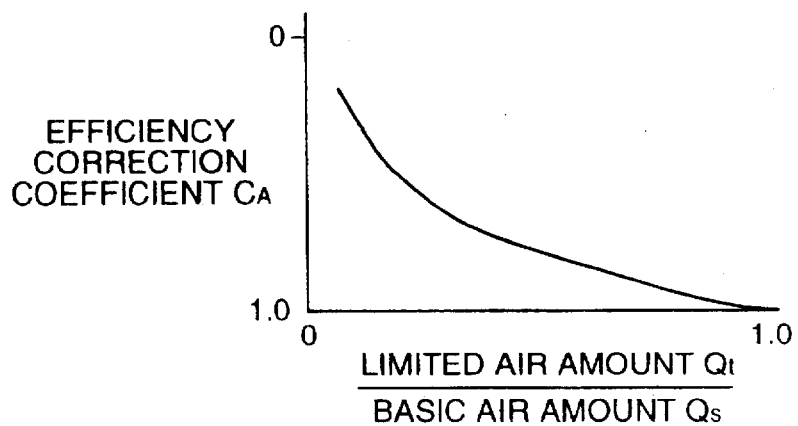
FIG. 16 is a characteristics graph of a fuel flow amount correction coefficient at the time of an intake air limitation according to the embodiment of the invention.

A correcting process of the basic fuel amount Fs determined in block 101 will now be described. In block 104, the efficiency change of the engine due to the intake air limitation performed in block 102 and the EGR is compensated by correcting the basic fuel amount Fs. In block 102, the value of the intake air limit rate is given to block 104. The intake air limit rate is set to (the total gas amount Qt)/(the basic air amount Qs). When there is no air limitation, the intake air limit rate is set to a value of 1. Block 104 has a data table 54 showing an efficiency correction coefficient value $C_A$ for the intake air limit rate as shown in FIG. 16. When the intake air amount is reduced in a constant fuel flow amount, since the A/F is shifted in the rich direction, the correction coefficient $C_A$ is set to a value smaller than 1. A characteristics curve of FIG. 16 shows a curve that is analogous to a characteristics curve of the specific fuel consumption for the A/F in FIG. 2. As will be explained hereinlater, by multiplying the correction coefficient $C_A$ to the basic fuel amount Fs, the fuel amount is corrected.

Figure 6:
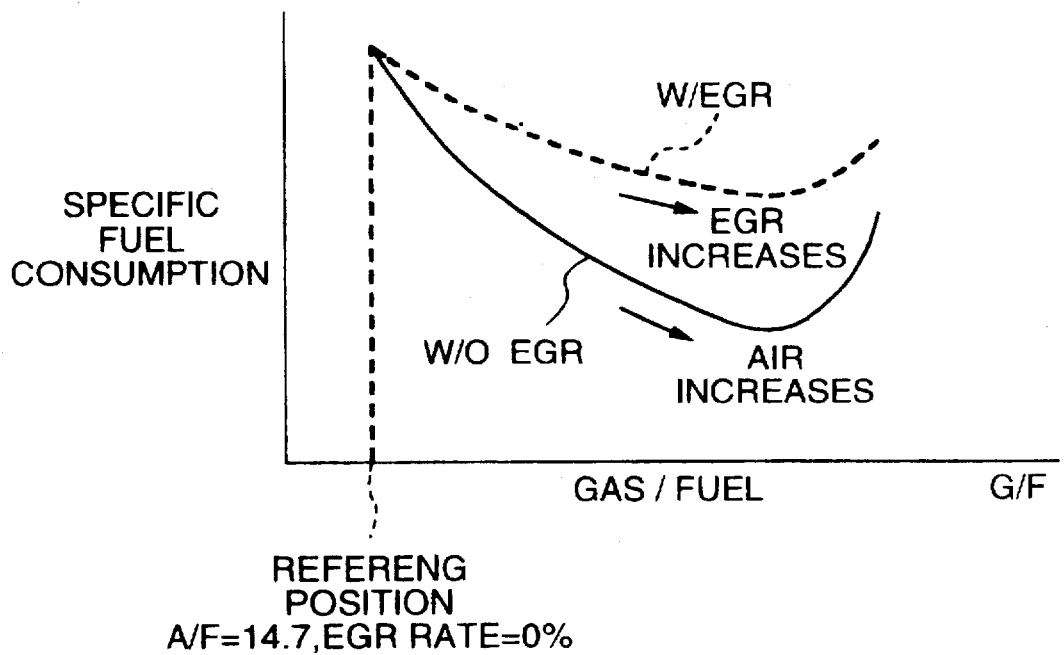
FIG. 6 is a characteristics graph showing a change in fuel consumption for a ratio of gas and fuel which are inhaled by the engine.

FIG. 6 shows a change in efficiency (specific fuel consumption) of the engine when the EGR is added. In FIG. 6, an axis of abscissa denotes a ratio (G/F) of a total amount of intake gas G and an amount of supplied fuel F which are inhaled by the engine and an axis of ordinate indicates a specific fuel consumption. It is assumed that a reference point is set to 14.7 as a stoichiometric A/F and the EGR is not performed. Characteristics when G/F is changed by increasing by only the intake air amount from the reference point without performing the EGR are shown by a solid line. Characteristics when G/F is changed by increasing the EGR amount are shown by a broken line. Since a specific heat ratio of air is higher than that of the exhaust gas, the air can more efficiently convert the heat generated by the combustion into a pressure, so that the characteristics shown by the solid line in which the EGR is not performed indicate a better specific fuel consumption. Therefore, a deterioration in efficiency when the EGR is executed can be obtained by a difference between inclinations of the curves of the solid line and broken line. A data table, accordingly, of a coefficient $C_B$ for correcting the efficiency of the engine due to the execution of the EGR is as shown in FIG. 17.

Figure 17:
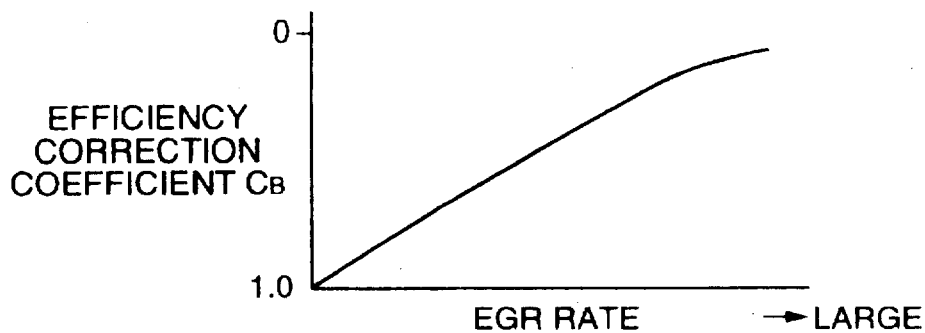
FIG. 17 is a characteristics graph of a fuel flow amount correction coefficient for the EGR rate according to the embodiment of the invention.

Block 104 has a table 55 of characteristics data indicative of the efficiency correction coefficient value $C_B$ for the EGR rate as shown in FIG. 17. As will be obviously understood from the characteristics of FIG. 6, there is a tendency such that a reduction rate of an engine efficiency (specific fuel consumption) in case of increasing EGR is smaller than a reduction rate of the engine efficiency in case of increasing by only the intake air amount. Therefore, the efficiency correction coefficient $C_B$ is determined so as to approach 0 with an increase in EGR rate as shown in FIG. 17. When the EGR is not performed, namely, the EGR rate is equal to 0, a value of the efficiency correction coefficient $C_B$ is equal to 1.

Figure 18:
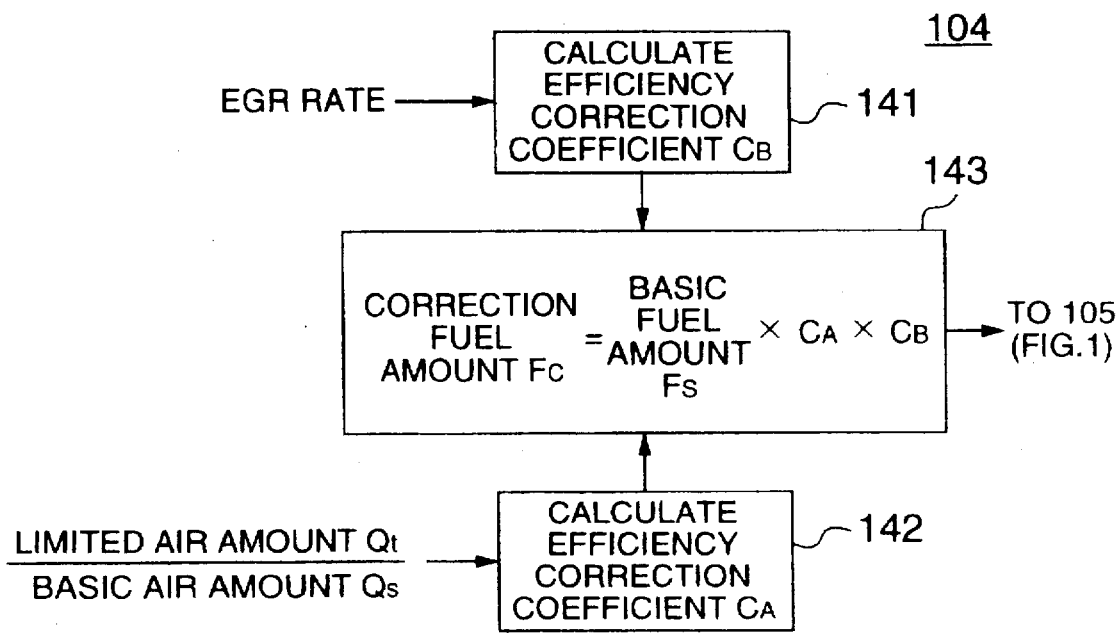
FIG. 18 is a block diagram of a fuel flow amount correcting system for correcting an output at the time of the intake air limitation and the EGR operation according to the embodiment of the invention.

The correction described above is executed in block 104 and a specific construction is shown in FIG. 18. In block 141 in FIG. 18, the EGR rate is received, the table 55 shown in FIG. 17 is retrieved, and the efficiency correction coefficient $C_B$ is decided. In block 142, the intake air limit rate Qt/Qs is received, the table 54 shown in FIG. 16 is retrieved, and the efficiency correction coefficient $C_A$ is determined. In block 143, the correction coefficients $C_A$ and $C_B$ to compensate a deteriorated amount of the specific fuel consumption are multiplied to the basic fuel amount Fs, and the resultant value is obtained as a corrected fuel amount Fc. Since the correction fuel amount Fc has a value in which an output power reduction of the engine due to the limitation of the intake air amount and the addition of the EGR is relatively compensated for the basic combustion conditions determined in block 101, it is a fuel amount which satisfies the original torque request Tr, namely, output request.

In block 105, the fuel/air ratio is obtained from the request air amount Qt and correction fuel amount Fc obtained as mentioned above. By multiplying the basic fuel amount Qt with the fuel/air ratio in block 126 in FIG. 12, the amount of fuel to be supplied can be easily obtained.

By executing the processes described above, the intake negative pressure necessary for performing the EGR described in FIG. 10 is assured and, at the same time, the output power that is required for the engine can be realized in consideration of a reduction in intake air amount due to the EGR.

Figure 20:
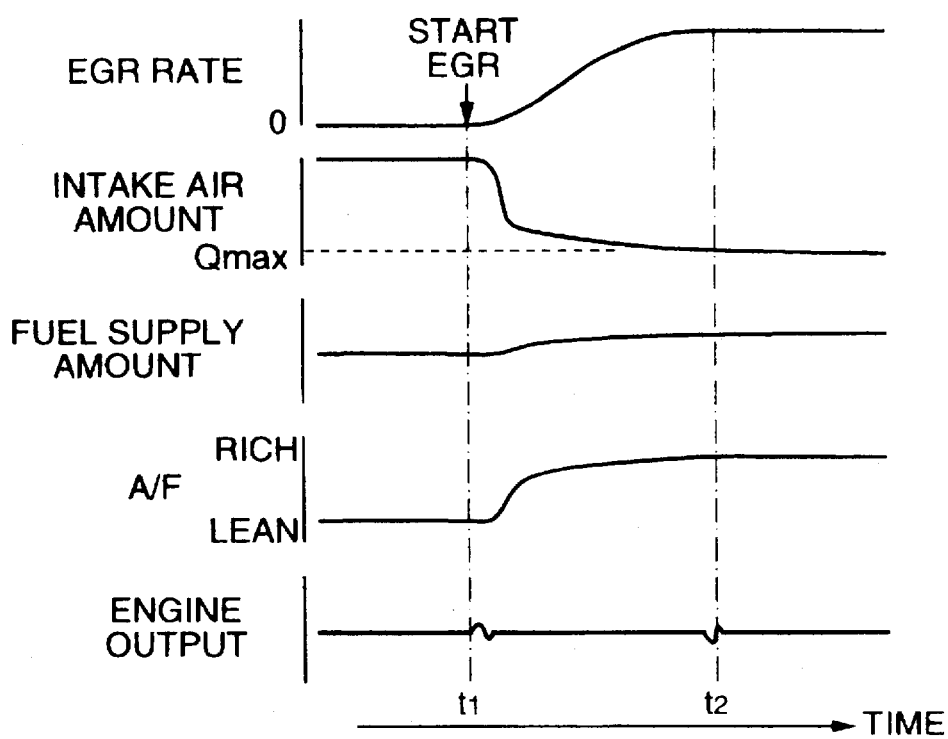
FIG. 20 shows changes in several parameters of the engine when the engine which is controlled by the control apparatus according to the embodiment of the invention is changed from a state without EGR to a state with EGR.

The operation of the control system of FIG. 1 will now be specifically explained. FIG. 20 shows time sequential changes in several engine parameters when the EGR is executed by a predetermined rate from the inoperative state of the EGR in the stationary driving condition. First, at the start of the EGR at time t1, when the basic air amount Qs exceeds Qmax, in order to assure the intake pressure of the intake pipe, the intake air amount is limited, thereby suddenly reducing the intake air amount to Qmax. Although the fuel is increased by an amount for compensating a deterioration in specific fuel consumption in association with a decrease in intake air amount and for assuring an output, the increase rate of fuel is not so large as decrease rate in air amount. Therefore, the A/F changes in the rich direction because a decrease in air amount is dominant. After that, when the EGR increases as the EGR valve is more opened, in order to keep the total intake gas amount of the engine to a predetermined value, the intake air amount is reduced by the increased amount of EGR. The fuel amount is increased by an amount for compensating the deteriorated amount of the specific fuel consumption corresponding to the value in which the air is converted into the EGR gas in the total intake gas amount of the engine and for assuring the output. The increase rate of fuel is not so large as decrease rate in air amount in a manner similar to the above case. Therefore, the A/F slowly changes in the rich direction because the reduction in air amount is dominant. When the EGR rate is settled to a target value at time t2, the other parameters also enter the stationary states. Since the necessary intake pressure is assured, a target amount of EGR can be assured. In the above processing steps, the engine output eventually keeps an almost constant value. When shifting from the operative mode of the EGR to the inoperative mode, a procedure that is almost opposite to the procedure described above is taken and the engine output likewise eventually keeps an almost constant value.

Figure 13:
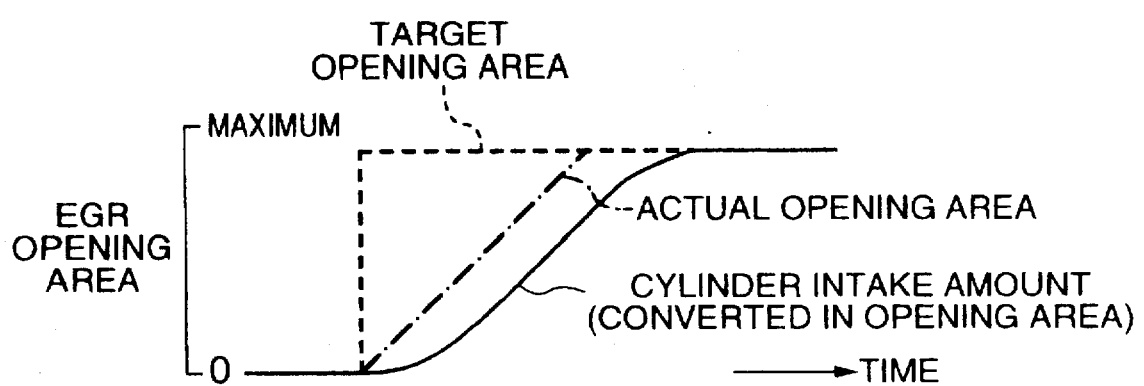
FIG. 13 is a response characteristics graph for explaining an operation delay of the EGR apparatus.
Figure 14:
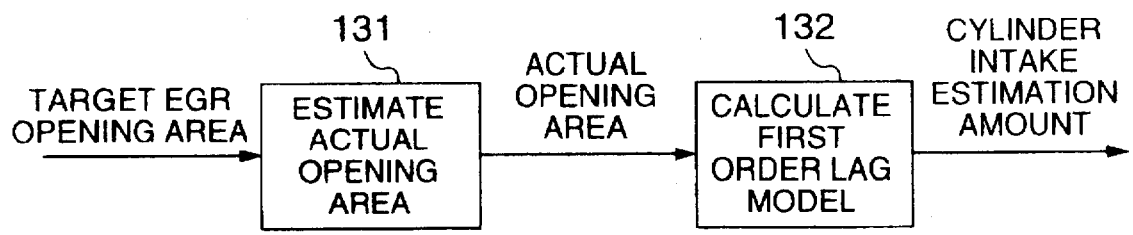
FIG. 14 is a block diagram of an embodiment of a system for estimating an EGR amount.

When executing the EGR, a delay time strictly exists until the exhaust gas is actually inhaled into a cylinder after a request amount of the EGR was calculated and the EGR valve was actuated. Specifically speaking, response characteristics shown in FIG. 13 are obtained. First, now assuming that a target opening area of the EGR changes from 0 to a certain value as shown by a broken line in the diagram, the actual opening area of the EGR valve operates as shown by an dot-dash line in the diagram with a mechanical delay in response to such a change. Further, the exhaust gas passes through the actual opening area and is inhaled into the cylinder with the first order lag as shown by a solid line in the diagram. This operation can be predicted because a response of the EGR system has been predetermined. The response can be predicted by, for example, a method shown in FIG. 14. The mechanical response delay which the EGR valve has is predicted in block 131 in accordance with the feature of the valve. For example, in case of the valve driven by a stepper motor, since an amount which can be stroked per unit time has been predetermined, it is possible to predict that an increase in opening area per time as shown in FIG. 13 is almost constant. In step 132, subsequently, since a response delay of a gas fluid can be predicted as a first order lag, a model calculation of the first order lag is executed and an amount of exhaust gas that is actually inhaled into the cylinder is predicted and calculated. For example, in the control system of FIG. 1, block 106 selectively uses in a manner such that the target EGR rate is used as a value of the EGR rate applied to block 103 and another EGR rate from block 132 based on the cylinder intake estimation amount is used as a value of the EGR rate applied to block 104, thereby making it possible to perform a further precise control.

When it is necessary to provide a limitation such that the control range of the A/F is leaner than the stoichiometric A/F as in case of, for example, using a 3-way catalyst converter, by limiting the air amount, it is necessary to provide a limitation of the fuel amount so that the A/F is not richer than the limit value. In such a case, in the A/F calculation in block 105 in FIG. 1, when the calculation result of the A/F is richer than the stoichiometric A/F, the way of limiting the A/F to the stoichiometric A/F may be considered. When the A/F is limited to the stoichiometric A/F irrespective of the request A/F, there is a situation such that the engine output can not be maintained in a predetermined value while keeping a target EGR rate. In such a case, unless the EGR request value is corrected, it cannot help avoiding a decrease in engine output from the target value.

In case that the A/F is deviated from the set value due to individual differences, deterioration, or the like of the engine and engine parts, the deviation is detected and an A/F correction parameter may be inputted into block 105 for correcting of A/F.

Figure 21:
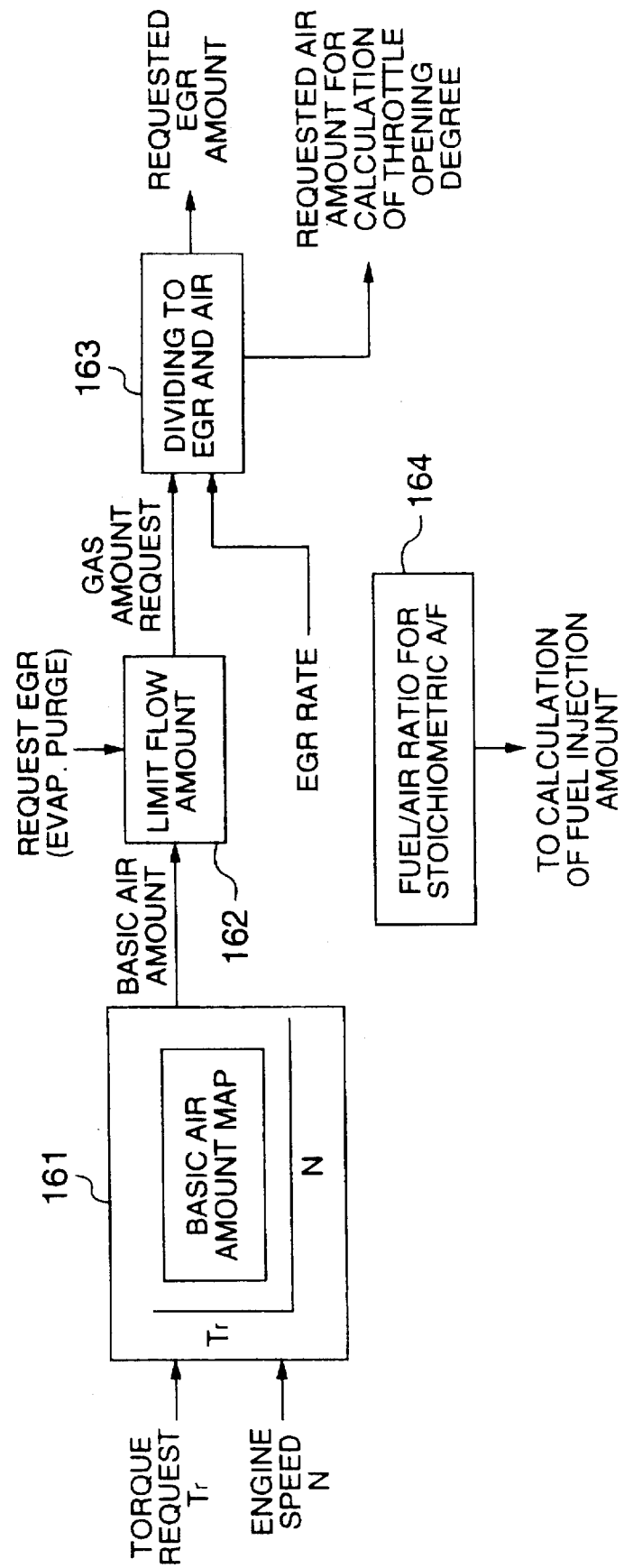
FIG. 21 is a block diagram of a control apparatus of an engine according to another embodiment of the invention.

Further, as described in FIG. 4, in case of obtaining a high engine output, when driving at the stoichiometric A/F, in the control system shown in FIG. 1, since the A/F is operated as a compensation processing result of a deterioration of an efficiency due to the air amount limitation and the EGR, the condition of a constant stoichiometric A/F cannot be maintained. Therefore, in case of driving at the stoichiometric A/F, for instance, a method of switching to a process as shown in FIG. 21 is considered. FIG. 21 is characterized in that a process for efficient correction 104 in FIG. 1 is not provided. Now, assuming that the A/F is held to the stoichiometric A/F as a prerequisite, a situation such that in order to keep the intake pressure necessary for performing the EGR, the intake air is limited and the engine output changes cannot be avoided because there is no degree of freedom of the operation in both of the air amount and the fuel supply amount. Therefore, a basic air amount which satisfies the torque request at the time of the stoichiometric A/F is obtained in block 161. A flow amount limitation similar to FIG. 1 is subsequently executed in block 162. A distribution of the intake gas amount similar to FIG. 1 is also executed in block 163. On the other hand, as for the fuel supply amount, an instruction of the stoichiometric A/F is uniformly supplied to the fuel injection amount calculation in block 164. Thus, the intake negative pressure necessary to add the EGR can be assured. However, in order to maintain the stoichiometric A/F, a compensation of the deterioration in efficiency due to the intake air limitation is not performed. In block 164, the fuel amount can be also determined so as to obtain a specific A/F other than the stoichiometric A/F.

Subsequently, FIG. 22 shows another embodiment in which the function of the embodiment shown in FIG. 1 is conveniently simplified in terms of a calculating process. First in blocks 171 and 172, a map which gives request values of a fuel supply amount and an air amount which are optimum for a torque request in an operative/inoperative state of the EGR is provided, respectively. In the embodiment, although the request values have been set to the air amount and the air/fuel ratio, this is because a system for determining the throttle opening degree value on the basis of the request air amount and determining the fuel injection amount calculation on the basis of the fuel/air ratio is considered as a prerequisite. It is sufficient to properly decide the kinds of control parameters for convenience of peripheral control. As for the air amount, fuel amount, and air/fuel ratio or fuel/air ratio, when two of those parameters are determined, the remaining one parameter can be decided. Therefore, in blocks 171 and 172, two of them are obtained. In block 173, the request air amount and request fuel/air ratio to be selected are switched in accordance with the presence or absence of the EGR. In blocks 174 and 175, transient correcting processes such as delay, advance, and the like for optimally controlling a transient change when the selection values are switched in block 173 are executed. The request values are supplied to the throttle opening degree operation and the fuel injection amount calculation, respectively. The embodiment is effective in a case such that an adding state of the EGR is simple and so long as only an addition or non-addition is decided, the optimum air amount and fuel amount can be determined to predetermined values.

In the above description, a clear explanation about whether a unit of the air amount and fuel amount is an amount per unit time or an amount per combustion cycle is not made. If the engine speed is used as a parameter, they can be calculated in any one of those units. Therefore, it is sufficient to properly select a dimension that is convenient when constructing the actual operation. In the construction like the embodiment, it is convenient to calculate the air amount on the basis of an amount per unit time because the throttle valve is controlled and it is convenient to calculate the fuel amount on the basis of an amount per combustion cycle because the injection valve is driven every combustion. When comparing the air amount and the fuel amount, accordingly, it is desirable to convert either one of the units into the other unit by using the rotational speed.

In the above description, although the control request of the EGR has been set to the EGR rate, even when the amount of EGR is used as a control request, by properly correcting the process for receiving the request value so as to match with a physical phenomenon, the invention can be applied.

Figure 19:
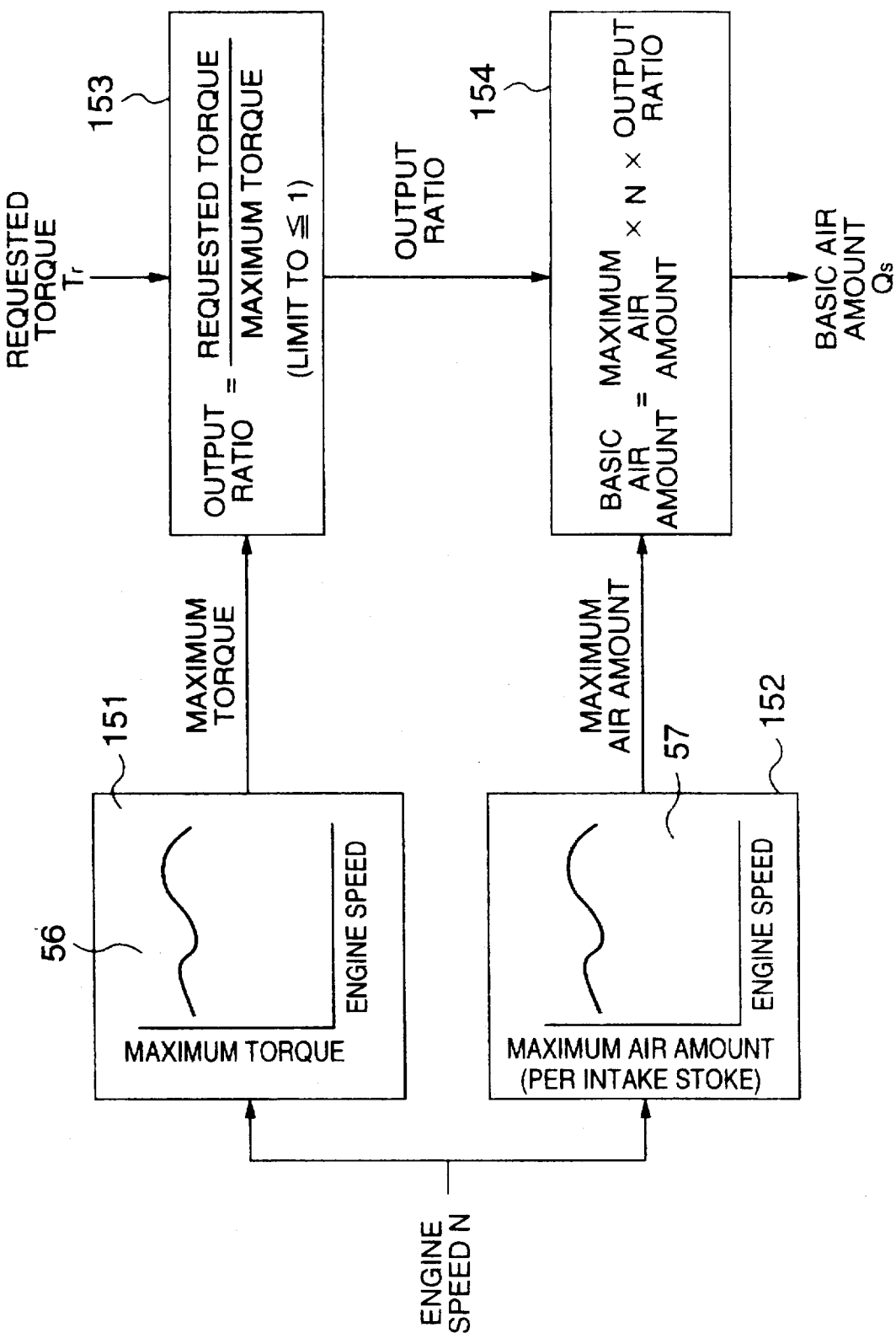
FIG. 19 is a block diagram of a system for obtaining a basic air amount according to the embodiment of the invention.

As shown in block 101 in FIG. 1, as a method other than the method of determining the basic air amount and fuel amount by using the maps 50 and 51, the basic air amount Qs can be also determined by a method as shown in FIG. 19. FIG. 19 shows a method of obtaining the basic air amount Qs and engine characteristics at the time of the setting of a predetermined A/F are used as a prerequisite. It is the same method as that by the map retrieval.

Block 151 has a data map 56 showing a possible maximum torque value for a desired rotational speed and a data map 57 showing a value of a possible maximum intake air amount per air intaking step for a desired rotational speed. Those maps are preliminarily experimentally decided. First in block 151, the maximum torque which can be obtained in this instance is obtained from the engine speed by retrieving the map 56. In block 153, by dividing the request torque by the maximum torque and limiting the maximum value to 1 as shown in the diagram, the resultant value is outputted as an output ratio. In block 152, the maximum intake air amount per air intaking process is likewise obtained from the rotational speed by retrieving the map 57. In block 154, the basic air amount Qs is derived from the output ratio, maximum air amount, and rotational speed. This is because, now assuming that the value at the time of the maximum output is set to a reference, there is a proportional relation between the output to be requested and the intake air amount. It is sufficient to obtain the basic fuel amount by executing calculations similar to blocks 152 and 154 with respect to the fuel amount. By using the present method, since it is unnecessary to set the map which needs a large memory capacity, the memory capacity can be reduced and the basic fuel amount and air amount can be accurately obtained.

Although the invention has been described above with respect to the engine with the construction such that the fuel is directly injected into the cylinder, the invention can be also applied to engines having other fuel supplying systems so long as the engine which can realize a stable combustion in a wide A/F range.

As mentioned above, the control apparatus of the internal combustion engine according to the invention obtains the basic intake air amount and fuel supply amount from various operating states and, after that, limits the intake air amount so as to assure the intake pipe pressure which can inhale the gas other than the intake air into the engine and corrects the fuel supply amount so that a required output can be assured. Therefore, the intake amount of gas other than the necessary intake air can be guaranteed irrespective of the maximum ability of the gas supplying means other than the intake air and the reduction of the output of the engine can be prevented by the adjustment of the supply fuel amount.

According to the invention, when the gas other than the intake air is inhaled into the internal combustion engine, the intake air amount and fuel supply amount are controlled so as to assure the intake pipe pressure necessary to inhale the gas without changing an output of the internal combustion engine, so that the necessary amount of gas other than the intake air can be supplied to the internal combustion engine while keeping the necessary output.

What is claimed is:

1. A control apparatus of an internal combustion engine, comprising:

air flow amount determining means for determining a request intake air flow amount corresponding to a target output of an engine;

fuel flow amount determining means for determining a request fuel flow amount which is supplied to the engine;

intake air amount limiting means for outputting a predetermined limit value as an intake gas total amount value when said determined request intake air flow amount exceeds said predetermined limit value under a predetermined control condition; and correcting means for correcting the value of said request fuel flow amount so that said engine generates said target output on the basis of said request intake air flow amount and said limit intake air flow amount when the intake air amount of said engine is limited.

2. An apparatus according to claim 1, further including an EGR apparatus for introducing a part of exhaust gas into an intake pipe, and wherein said predetermined control condition is a case where said EGR apparatus operates.

3. An apparatus according to claim 2, wherein said correcting means determines a first correction coefficient corresponding to a ratio between said request intake air flow amount and said intake gas total amount value and a second correction coefficient corresponding to an exhaust gas flow amount of said EGR apparatus and corrects the value of said request fuel flow amount on the basis of said first and second correction coefficients so that said engine generates said target output.

4. An apparatus according to claim 3, further having a memory device in which values of said first correction coefficient and said second correction coefficient corresponding to a target output value have been stored, and wherein when said target output is given, said correcting means reads out the values of said first and second correction coefficients from said memory device.

5. An apparatus according to claim 2, wherein said intake air amount limiting means has means for determining said predetermined limit value according to an engine speed, when said request intake air flow amount exceeds said limit value in the case where said EGR apparatus operates, said intake air amount limiting means outputs said limit value, and when said EGR apparatus doesn't operate, said intake air amount limiting means outputs said request intake air flow amount value determined by said air flow amount determining means as an intake gas total amount value.

6. An apparatus according to claim 5, wherein said means for determining said predetermined limit value is a memory device in which a map indicative of said predetermined limit value according to an engine speed has been stored.

7. An apparatus according to claim 6, wherein said memory device has a plurality of maps in which characteristics of said predetermined limit value for the value of said engine speed are different.

8. An apparatus according to claim 5, further having gas amount determining means for determining an intake air flow amount and an exhaust gas flow amount from said intake gas total amount value which is outputted from said intake air amount limiting means and a desired target EGR rate.

9. An apparatus according to claim 8, further having means for calculating a fuel/air ratio of a mixture from the value of the intake air flow amount determined by said gas amount determining means and the value of the request fuel flow amount corrected by said correcting means.

10. An apparatus according to claim 9, further having: air flow amount control means for controlling an intake air in accordance with an output from said flow amount determining means; and fuel injecting means for controlling a flow amount of fuel that is supplied to the engine in accordance with a value of a fuel/air ratio from said means for calculating said fuel/air ratio.

11. An apparatus according to claim 1, further having an apparatus for absorbing an evaporation fuel from a fuel system, and wherein said predetermined control condition is a case where fuel gas is purged from said absorbing apparatus into an intake pipe.

12. An apparatus according to claim 8, further having EGR rate determining means, and wherein said EGR rate determining means includes means for predicting an actual EGR rate on the basis of said target EGR rate that is given from said gas amount determining means and predetermined response characteristics of said EGR apparatus, supplies said target EGR rate to said gas amount determining means, and supplies the predicted EGR rate to said correcting means.

13. An apparatus according to claim 1, wherein said air flow amount determining means includes:

means for determining a possible maximum output torque at an engine speed on the basis of said engine speed;

means for calculating an output ratio between a target torque and said maximum output torque;

means for determining a possible maximum intake air amount at said engine speed; and means for mutually multiplying said maximum intake air amount, said engine speed, and said output ratio, thereby obtaining said request intake air flow amount.

14. An apparatus according to claim 1, further having means for determining a fuel flow amount value so that a mixture has a specified air/fuel ratio, and wherein when a driving at said specified air/fuel ratio is required, said means for determining said fuel flow amount value is made operative in place of said correcting means.

15. An apparatus according to claim 14, wherein said specified air/fuel ratio is substantially a stoichiometric air/fuel ratio.

16. An apparatus according to claim 2, wherein said intake air amount limiting means and said correcting means have a map indicative of said intake gas total amount value which corresponds to said target output and was determined in consideration of said predetermined limit value and said request fuel flow amount value corrected in the case where said EGR apparatus operates.

17. An apparatus according to claim 1, wherein said control apparatus is installed in a vehicle in which said engine is mounted, said control apparatus has means for generating said target output, and said target output generating means has predetermined output characteristics data indicative of a target output value for a value of an engine speed and determines said target output as a value corresponding to an output torque of the engine in accordance with said output characteristics data on the basis of a depression amount of an acceleration pedal of said vehicle and said engine speed.

18. A control method of an internal combustion engine, comprising the steps of:

determining a request intake air flow amount corresponding to a target output of an engine;

determining a request fuel flow amount which is supplied to the engine;

outputting a predetermined limit value as an intake gas total amount value when said determined request intake air flow amount exceeds said predetermined limit value under a predetermined control condition; and correcting the value of said request fuel flow amount so that said engine generates said target output on the basis of the values of said request intake air flow amount and said limit intake air flow amount when an intake air amount of said engine is limited.

19. A method according to claim 18, wherein said predetermined control condition is a case where an EGR apparatus for introducing a part of exhaust gas into an intake pipe operates.

20. A method according to claim 19, wherein in said correcting step, a first correction coefficient corresponding to a ratio between said request intake air flow amount and said intake gas total amount value and a second correction coefficient corresponding to an exhaust gas flow amount of said EGR apparatus are determined, and the value of said request fuel flow amount is corrected on the basis of said first and second correction coefficients so that said engine generates said target output.

21. A method according to claim 19, wherein said step of limiting said intake air amount includes a step of determining said predetermined limit value according to an engine speed, when said request intake air flow amount exceeds said limit value in the case where said EGR apparatus operates, said limit value is outputted, and when said EGR apparatus doesn't operate, said request intake air flow amount value determined in said air flow amount determining means is outputted as an intake gas total amount value.

* * * * *